United States Patent

[11] 3,567,974

[72] Inventor: Horst Spingler, Bad Neustadt Saale, Germany
[21] Appl. No.: 852,298
[22] Filed: Aug. 22, 1969
[45] Patented: Mar. 2, 1971
[73] Assignee: Siemens Aktiengesellschaft, Berlin, Germany
[32] Priority: Aug. 28, 1968
[33] Germany
[31] P 17 63 876.5

[54] DYNAMOELECTRIC MACHINE WITH PERMANENT-MAGNET EXCITATION
6 Claims, 4 Drawing Figs.

[52] U.S. Cl. .................................................. 310/46, 310/154, 310/156
[51] Int. Cl. .................................................. H02k 37/00
[50] Field of Search .................................................. 310/154, 177, 185, 186, 181, 187, 188, 189, 191, 193, 156, 211, 217, 218, 254, 258, 46

[56] References Cited
UNITED STATES PATENTS

| | | | |
|---|---|---|---|
| 969,608 | 9/1910 | Davis | 310/218 |
| 2,048,161 | 7/1936 | Klaiber | 310/154 |
| 2,627,582 | 2/1953 | Hayes | 310/186 |
| 2,993,134 | 7/1961 | Harvey | 310/154 |
| 3,217,198 | 11/1965 | Krupick | 310/181 |
| 3,427,486 | 2/1969 | Whitney | 310/156 |

Primary Examiner—Milton O. Hirshfield
Assistant Examiner—R. Skudy
Attorneys—Curt M. Avery, Arthur E. Wilfond, Herbert L. Lerner and Daniel J. Tick ABSTRACT: An electric machine such as a motor or generator is provided with wedge-shaped pole cores which are secured to the rotor or stator structure in radially spaced relation thereto so that an airgap remains between each pole core and the structure to which the core is attached. The cores are angularly spaced from each other and taper toward the stator or rotor structure to which they are fastened. Abutment members are also fastened to the same structure in angularly spaced relation to the pole cores. Ceramic blocks of permanent magnet material are fastened between each pole core and the adjacent abutment member so that opposite faces of each permanent magnet block are in face-to-face engagement with one pole core and one abutment member. The magnets have a large cross section in comparison with their length measured between the north and south poles that are adjacent to the pole core and the abutment respectively. That is, the ceramic magnets have the shape of prisms whose cross section is an elongated rectangle whose length between north and south poles is parallel to the shorter side of the rectangle.

DYNAMOELECTRIC MACHINE WITH PERMANENT-MAGNET EXCITATION

My invention relates to a permanent magnet excited electrical machine whose stator or rotor is provided with inserted blocks of ceramic permanent magnets. When using ceramic permanent magnet materials in this manner, it is necessary to give them the shape of blocks whose length, measured between north and south pole, is short in comparison with at least one of the transverse dimensions. That is, the cross section of such magnets transverse to the pole axis is rather large. The insertion of such blocks into the stator or rotor of a dynamoelectric machine often causes considerable difficulties because of the limitation and configuration of the available space. This is particularly so because the pole faces of the magnet blocks facing the rotor must not be too large because otherwise the occurrence of a rotor transverse field would be excessively promoted with the result of causing the possibility of instabilities during operation of the machine.

It is therefore an object of my invention to devise a dynamoelectric machine which affords the insertion of ceramic permanent magnets in a simple manner but with the result of securing a reliable mounting and a reliable machine operation conjointly with the possibility of readily disassembling the magnets from the machine if this should be needed.

Another object of the invention, subsidiary to the one already mentioned, is to permit limiting the machining work to be done when preparing the magnets, to the grinding or otherwise machining of only two parallel faces of these magnet blocks.

Still another object of my invention is to afford providing permanent magnet excited machines with means for adjusting or varying magnetic stray paths between the poles and the stator or rotor structure to which the permanent magnets are fastened; and it is a more specific object to thus permit a compensation of flux differences between individual poles.

To achieve these objects, and in accordance with a feature of my invention, I fasten the ceramic blocks of permanent magnet material, dimensioned as described above, with the aid of wedge-shaped pole cores and correspondingly shaped abutment members so that the permanent magnet blocks are held in face-to-face constrained relation between the pole core and the abutment member. I further provide between the pole cores and these stator or rotor magnetizable structure to which the cores are fastened, an interspace which constitutes a field gap or airgap. Preferably, the pole cores are fastened to the stator or rotor structure with the aid of screw bolts so as to permit varying the width of the airgap.

With such a mounting of magnet blocks, the insertion of the blocks is extremely simple and the blocks need only be machined at those parallel faces which are to be in contact engagement with the pole cores and the abutment members. By virtue of the airgap between the pole and the stator or rotor structure, and the possibility of varying the gap with the aid of the fastening bolt, any magnetic flux difference between the individual poles can be equalized and the entire flux level can be adjusted with a high degree of sensitivity and accuracy.

The invention will be further described with reference to embodiments illustrated by way of example on the accompanying drawing, in which.

Figure 1:
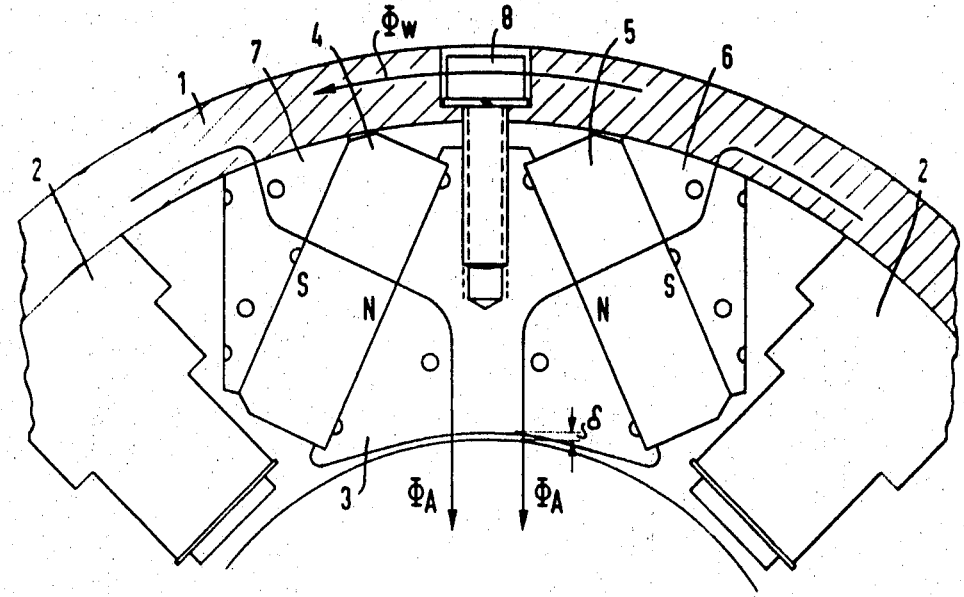
FIG. 1 is a partial and partly sectional view of a machine stator with salient poles.

Denoted in FIG. 1 by 1 is the stator structure of a direct-current machine, the structure consisting of magnetizable iron. A stator structure carries main poles and interpoles 2, 3 the latter being each provided with a winding and serving the purpose of improving the commutation performance of the machine. Each of the main poles, according to the invention, comprises a wedge-shaped pole core 3, at least two ceramic permanent magnet blocks 4 and 5, as well as two abutment members 6 and 7. The pole cores 3 and the abutment member 6, 7 are fastened to the stator structure, with the cores tapered in the direction toward the periphery of the stator structure. The magnet blocks 4 and 5 are placed between the pole core and the respective abutment members. The pole core is fastened to the yoke portion 1 of the stator by means of a nonmagnetic screw bolt 8, whereas the abutment members 6 and 7 are directly in area contact with the stator yoke.

Figure 2:
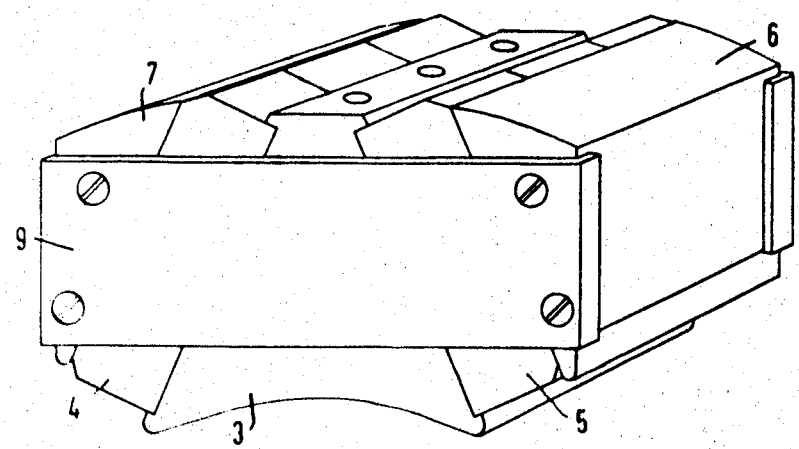
FIG. 2 is a schematic perspective view of one of the main poles appertaining to the machine according to FIG. 1.

One of the main poles according to FIG. 1 is separately shown in FIG. 2. The abutment members 6 and 7 in this embodiment are separate components which are composed of sheet/metal laminations. The laminations are held together by front plates 9 which preferably consist of nonferromagnetic material. The members 6 and 7, however, may also be made of solid iron. When tightening the fastening bolts 8, the abutment members 6 and 7 are forced tightly against the yoke portion 1 of the stator so that a uniform and accurately centered assembly will result. In FIG. 1, the main flux is designated by $\Phi_A$. The commutation flux is denoted by $\Phi_W$. 119 The main pole airgap $\delta$ can be corrected or adjusted by insertion of shims between the pole core 3 and the magnet blocks 4, 5 or between the magnet blocks and the abutment members 6, 7 or between the members 6, 7 and the stator yoke structure 1.

Figure 3:
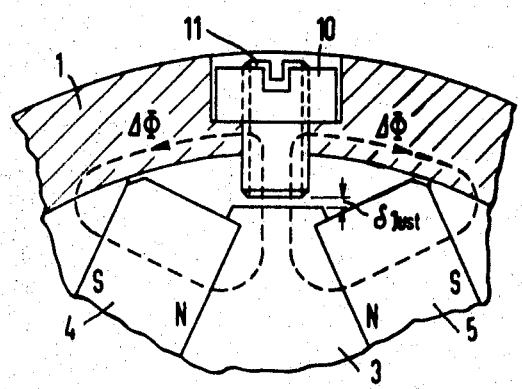
FIG. 3 is another partial and partly sectional view of another machine with salient poles.

If desired, the abutment members 6,7 may also be made an integral part of the stator iron structure. For example, if the stator consists of the stack of laminations, the abutment members 6, 7 may simply be shaped as part of the punchings of which the stack is composed. Between the pole fastening bolts 8, seen in the axial direction, there are inserted one or several screw bolts of ferromagnetic material (inserted into the yoke), as is shown in FIG. 3. These bolts 10 form a stray path between the stator yoke and the pole. By turning the bolts 10 more or less into the stator structure, the magnetic stray flux $\Delta$ can be controlled which permits equalizing any flux differences between the individual main poles and also affords adjusting the entire flux level of the machine. After adjusting the corresponding airgap $\delta_{Just}$, the bolt 10 is securely fastened with the aid of a lock nut 11.

Figure 4:
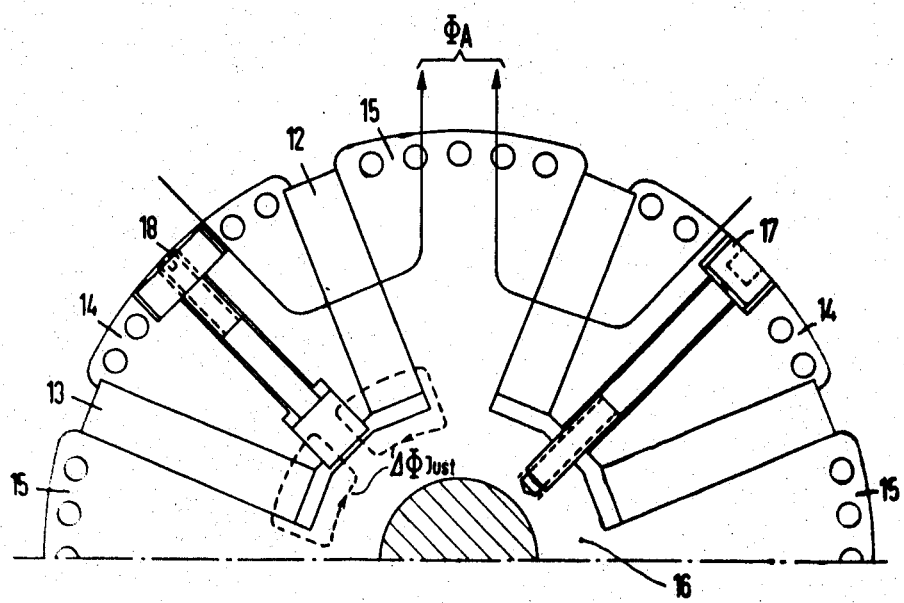
FIG. 4 shows partly an axial view onto the rotor of a machine with internal poles.

FIG. 4 shows the motor of an internal-pole machine which in principle is designed in the same manner as the embodiment according to FIG. 1. As shown in FIG. 4, the magnet blocks 12 and 13 are fastened between wedge-shaped pole cores 14 and abutment members 15. The abutment members form conjointly with the iron structure 16 of the rotor a supporting star structure into which the magnets and the pole cores are placed and the cores are fastened with the aid of nonferromagnetic screws 17. Denoted by 18 is a ferromagnetic adjusting screw or bolt.

To those skilled in the art it will be obvious upon a study of this disclosure that my invention permits of various modifications and may be given embodiments other than particularly illustrated and described herein without departing from the essential features set forth in the claims annexed hereto.

I claim:

1. Dynamoelectric machine with permanent magnet excitation comprising a magnetizable stator structure, a magnetizable rotor structure, wedge-shaped pole cores disposed on one of said structures in radially spaced relation thereto so as to form an airgap between each of said pole cores and the other of said structures, said cores being angularly spaced from each other, each of said cores having surface means, tapering toward said one structure, abutment members disposed in angularly spaced relation to said respective pole cores, ceramic permanent magnet blocks held between said respective pole cores and abutment members, each one of said blocks having opposite faces in face-to-face engagement with said surface means permanent magnet one of said respective pole cores and one of said respective abutment members, and securing means securing said core to said one structure so as to leave an airgap therebetween, whereby said blocks are held by being wedged between said respective pole cores and abutment members.

2. In a machine according to claim 1, each one of said permanent magnetic blocks having respective north and south poles adjacent said surface means of said one of said respective pole cores and said one of said respective abutment members and having between said north and south poles a length shorter than the largest transverse dimension of the block.

3. In a machine according to claim 2, said permanent magnet blocks being respectively inserted between each of said pole cores and the adjacent one of said abutment members, each of said blocks having the shape of an elongated prism whose longest dimension extends parallel to said opposite faces.

4. In a machine according to claim 1, said securing means being nonmagnetic screw means which fasten said pole cores to said one structure.

5. Machine according to claim 1, comprising means for adjusting a magnetic stray flux path between said pole cores and said one structure.

6. Machine according to claim 5, wherein said stray-path adjusting means comprise a ferromagnetic screw member adjustably seated in one of said two structures and being adjustable relative to the other structure.